(12) United States Patent
Nishimura et al.

(10) Patent No.: US 11,606,051 B2
(45) Date of Patent: Mar. 14, 2023

(54) MOTOR DRIVING CIRCUIT, INTEGRATED CIRCUIT DEVICE, ELECTRONIC APPARATUS, AND MOTOR CONTROL METHOD

(71) Applicant: SEIKO EPSON CORPORATION, Tokyo (JP)

(72) Inventors: Motoaki Nishimura, Chino (JP); Haruo Hayashi, Shiojiri (JP); Makoto Katase, Azumino (JP); Yusuke Sano, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/083,756

(22) Filed: Oct. 29, 2020

(65) Prior Publication Data

US 2021/0135610 A1    May 6, 2021

(30) Foreign Application Priority Data

Oct. 31, 2019 (JP) .............................. JP2019-198388

(51) Int. Cl.
*H02P 8/04* (2006.01)
*H02P 8/24* (2006.01)
*H02P 8/12* (2006.01)

(52) U.S. Cl.
CPC .................. *H02P 8/04* (2013.01); *H02P 8/12* (2013.01); *H02P 8/24* (2013.01)

(58) Field of Classification Search
CPC ...... H02P 8/04; H02P 8/24; H02P 8/12; H02P 8/00; H02P 8/02; H02P 8/10; H02P 8/26; H02P 8/28; H02P 8/30; H02P 8/36; H02P 8/40; H02P 25/03; H02P 7/00; H02P 7/02; H02P 7/025; H02P 7/03; H02P 7/29; H02P 7/281; H02P 3/08; H02P 6/24
See application file for complete search history.

(56) References Cited

U.S. PATENT DOCUMENTS

| 4,843,409 A | * | 6/1989 | Matzuzaki | ................. B41J 2/36 347/172 |
| 4,869,610 A | * | 9/1989 | Nishizawa | .............. H02P 23/20 400/279 |
| 4,890,214 A | * | 12/1989 | Yamamoto | .............. G05F 1/468 363/25 |

(Continued)

FOREIGN PATENT DOCUMENTS

| JP | H09308296 | * | 11/1997 | |
| JP | 3567579 B2 | * | 9/2004 | ................ H02P 8/24 |

(Continued)

*Primary Examiner* — Antony M Paul
(74) *Attorney, Agent, or Firm* — Rankin, Hill & Clark LLP

(57) ABSTRACT

A motor driving circuit includes a stepping motor driving circuit that controls driving of a stepping motor, a DC motor driving circuit that controls driving of a DC motor, and a control circuit that controls the stepping motor driving circuit and the DC motor driving circuit. The control circuit, upon accepting a driving instruction for driving the stepping motor in the middle of the DC motor driving circuit performing driving of the DC motor, stops driving of the DC motor by the DC motor driving circuit, and starts driving of the stepping motor by the stepping motor driving circuit.

8 Claims, 2 Drawing Sheets

(56) References Cited

U.S. PATENT DOCUMENTS

| | | | | |
|---|---|---|---|---|
| 4,924,264 A * | 5/1990 | Ito | ............ | G03G 15/502 399/81 |
| 4,958,190 A * | 9/1990 | Ito | ............ | G03G 15/043 399/223 |
| 5,072,317 A * | 12/1991 | Fukushima | ............ | G11B 33/10 360/71 |
| 5,144,503 A * | 9/1992 | Fukushima | ............ | G11B 19/20 360/78.04 |
| 5,238,315 A * | 8/1993 | Kitabata | ............ | B41J 11/42 400/314.1 |
| 5,669,721 A * | 9/1997 | Santon | ............ | B41J 11/42 400/582 |
| 6,318,839 B1 * | 11/2001 | Elgee | ............ | B41J 19/207 347/37 |
| 6,452,147 B1 * | 9/2002 | Inada | ............ | G03G 15/0194 399/394 |
| 7,450,265 B1 * | 11/2008 | Austin | ............ | B41J 29/023 347/19 |
| 9,582,443 B1 * | 2/2017 | Switzer | ............ | G06F 13/28 |
| 2001/0006586 A1 * | 7/2001 | Day | ............ | B41J 29/02 400/70 |
| 2004/0246285 A1 * | 12/2004 | Endo | ............ | B41J 2/5058 347/14 |
| 2004/0247364 A1 * | 12/2004 | Endo | ............ | B41J 11/0065 400/579 |
| 2005/0156370 A1 * | 7/2005 | Lang | ............ | G03G 15/502 271/9.1 |
| 2006/0119631 A1 * | 6/2006 | Endo | ............ | B41J 11/008 347/14 |
| 2007/0290635 A1 * | 12/2007 | Yoshida | ............ | H02P 8/40 318/66 |
| 2007/0291063 A1 * | 12/2007 | Akase | ............ | B41J 19/207 347/14 |
| 2008/0019755 A1 * | 1/2008 | Austin | ............ | B41J 3/36 400/319 |
| 2011/0057974 A1 * | 3/2011 | Kobayashi | ............ | B41J 29/38 347/14 |
| 2013/0249458 A1 * | 9/2013 | Abou-Kasm | ............ | H02P 7/292 318/400.27 |
| 2014/0265993 A1 * | 9/2014 | Watahiki | ............ | H02P 8/34 318/696 |
| 2015/0097503 A1 * | 4/2015 | Kim | ............ | H02P 7/05 318/459 |
| 2015/0318804 A1 * | 11/2015 | Maeshima | ............ | H02P 6/12 318/400.02 |
| 2017/0242368 A1 * | 8/2017 | Nohara | ............ | H04N 1/04 |
| 2019/0302698 A1 * | 10/2019 | Kawaguchi | ............ | G04C 3/067 |

FOREIGN PATENT DOCUMENTS

| | | | |
|---|---|---|---|
| JP | 2016-170004 | | 9/2016 |
| JP | 2016170004 A | * | 9/2016 |

* cited by examiner

MOTOR DRIVING CIRCUIT, INTEGRATED CIRCUIT DEVICE, ELECTRONIC APPARATUS, AND MOTOR CONTROL METHOD

The present application is based on, and claims priority from JP Application Serial Number 2019-198388, filed Oct. 31, 2019, the disclosure of which is hereby incorporated by reference herein in its entirety.

BACKGROUND

1. Technical Field

The present disclosure relates to a motor driving circuit, an integrated circuit device, an electronic apparatus, and a motor control method.

2. Related Art

For example, a method of driving motors in a queue order is described in JP-A-2016-170004.

However, with a method of driving motors in a queue order, the instruction from a user is also included in the queue, and therefore there is a problem in that the instructed operation cannot be quickly performed in response to the instruction, for example.

SUMMARY

A motor driving circuit of the present disclosure includes:
a stepping motor driving circuit configured to control driving of a stepping motor;
 a DC motor driving circuit configured to control driving of a DC motor; and
 a control circuit configured to control the stepping motor driving circuit and the DC motor driving circuit,
  wherein the control circuit, upon accepting a driving instruction for driving the stepping motor in the middle of the DC motor driving circuit performing driving of the DC motor, stops driving of the DC motor by the DC motor driving circuit, and starts driving of the stepping motor by the stepping motor driving circuit.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Hereinafter, a motor driving circuit, an integrated circuit device, an electronic apparatus, and a motor control method of this disclosure will be described in detail based on embodiments illustrated in the attached drawings.

First Embodiment

Figure 1:
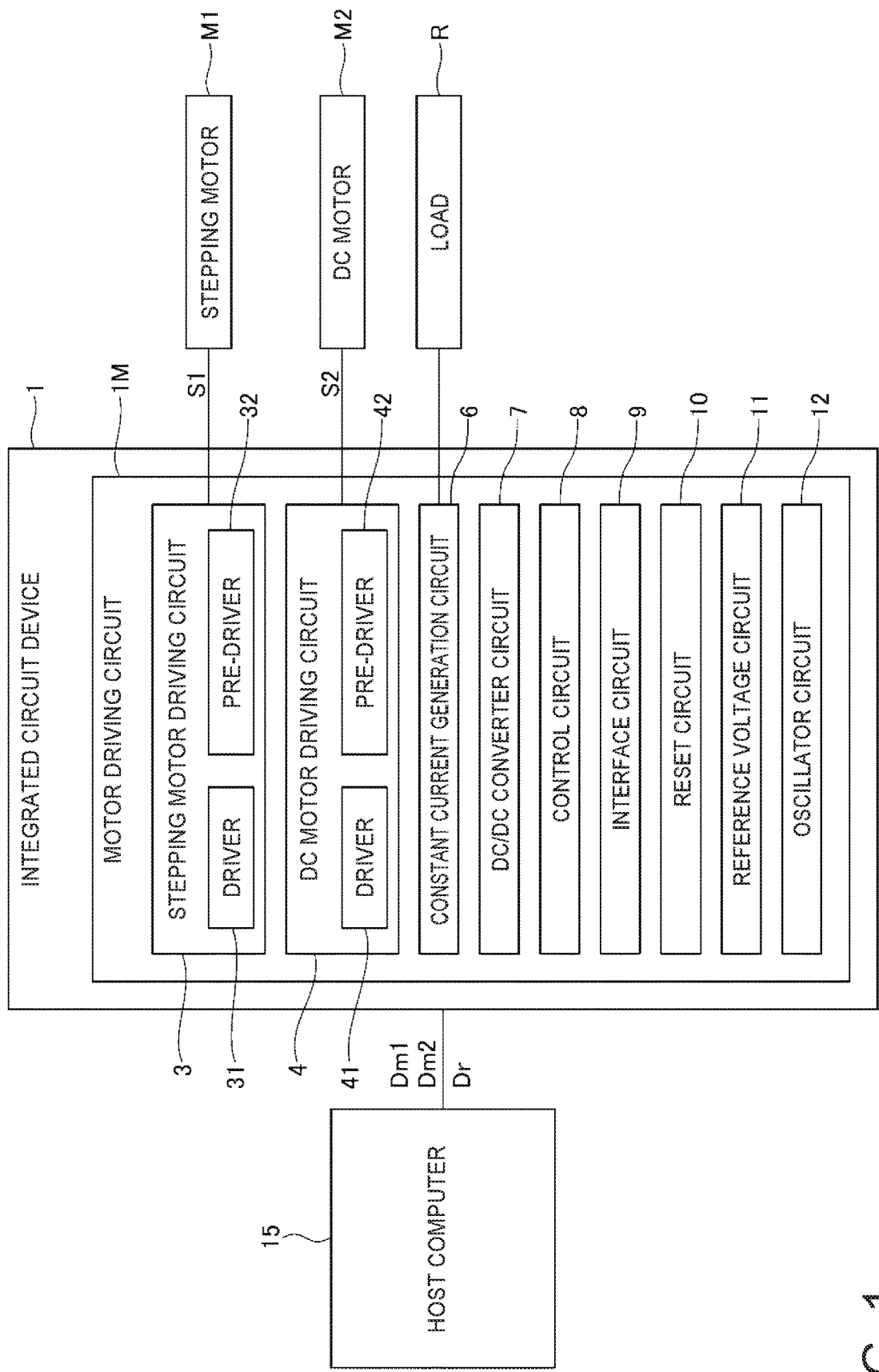
FIG. 1 is a block diagram illustrating a circuit configuration of an integrated circuit device according to a first embodiment.

FIG. 1 is a block diagram illustrating a circuit configuration of an integrated circuit device according to a first embodiment.

An integrated circuit device 1 in FIG. 1 is configured such that an IC chip in which a motor driving circuit 1M is formed on a silicon substrate is housed in a package, which is not illustrated, for example. The motor driving circuit 1M includes a stepping motor driving circuit 3, a DC motor driving circuit 4, a constant current generation circuit 6, a DC/DC converter circuit 7, a control circuit 8, an interface circuit 9, a reset circuit 10, a reference voltage circuit 11, and an oscillator circuit 12.

The control circuit 8 is a logic circuit that includes logic cells such as NAND, NOR, an inverter, and a D flip-flop, and performs logical operations and storing operations. Also, the control circuit 8 is realized by a gate array, a microcomputer, or the like, and performs various sequence control and determination processing. Also, the control circuit 8 controls the entirety of the integrated circuit device 1, that is, controls each of the circuits.

Also, the interface circuit 9 includes an input-output port, and is a circuit that communicates with a host computer 15, for example. The host computer 15 can output a driving instruction Dm1 for driving a stepping motor M1, a driving instruction Dm2 for driving a DC motor M2, and a constant current supplying instruction Dr for supplying a constant current to a load R, at respective predetermined timings. The host computer 15 communicates with the motor driving circuit 1M by wire or wirelessly. In this case, the communication may be performed via a network such as the Internet.

Also, the reset circuit 10 is a circuit that initializes each circuit, and specifically in the present embodiment, is constituted by a power-on reset (POR) circuit. Also, the reference voltage circuit 11 is a circuit that generates a reference voltage that is used in the circuits, for example. Also, the oscillator circuit 12 is a circuit that generates a clock signal having a predetermined frequency.

The DC/DC converter circuit 7 generates a power supply voltage to be supplied to the circuits by stepping down an input voltage that is input from the outside. The DC/DC converter circuit 7 is a current-mode control switching regulator, for example. Note that the configuration of the DC/DC converter circuit 7 is not specifically limited as long as the power supply voltage can be generated from the input voltage.

The stepping motor driving circuit 3 is a circuit that controls driving of the stepping motor M1 that is electrically connected to the motor driving circuit 1M. Also, the stepping motor driving circuit 3 includes a driver 31 and a pre-driver 32. Also, the driver 31 is electrically connected to the stepping motor M1, and controls driving of the stepping motor M1 by outputting a driving signal S1 for driving the stepping motor M1. Meanwhile, the pre-driver 32 controls driving of the driver 31 based on an instruction from the control circuit 8. Note that the configuration of the stepping motor driving circuit 3 is not specifically limited, as long as the driving of the stepping motor M1 can be controlled.

The DC motor driving circuit 4 is a circuit that controls driving of the DC motor M2 that is electrically connected to the motor driving circuit 1M. Also, the DC motor driving circuit 4 includes a driver 41 and a pre-driver 42. Also, the driver 41 is electrically connected to the DC motor M2, and controls driving of the DC motor M2 by outputting a driving signal S2 for driving the DC motor M2. Meanwhile, the pre-driver 42 controls driving of the driver 41 based on an instruction from the control circuit 8. Note that the configuration of the DC motor driving circuit 4 is not specifically limited, as long as the driving of the DC motor M2 can be controlled.

The constant current generation circuit 6 is a circuit that is electrically connected to the load R, and can make the current flowing through the load R constant. The load R is not specifically limited, and various types of light sources, a resistor, a coil, a vibrator, and the like are envisioned. The constant current generation circuit 6 includes a comparator and an H bridge circuit, for example. Also, the voltage generated across a current detection resistor connected to a GND side of the H bridge is compared, by the comparator, with the reference voltage generated by the reference voltage circuit 11, and ON/OFF control of the current flowing from the H bridge to the load R is performed based on the comparison result. That is, PWM (Pulse Width Modulation) control is performed. With this, the circuit configuration of the constant current generation circuit 6 is relatively simplified. Note that the configuration of the constant current generation circuit 6 is not specifically limited, as long as the current flowing through the load R can be kept constant.

The configurations of the respective circuits have been described above. Next, the method of control performed by the control circuit 8 will be described. The control circuit 8 preferentially performs the driving of the stepping motor M1, out of the driving of the stepping motor M1 by the stepping motor driving circuit 3, the driving of the DC motor M2 by the DC motor driving circuit 4, and the supplying of the constant current to the load R by the constant current generation circuit 6.

That is, the control circuit 8, upon accepting an instruction to drive the stepping motor M1 from the host computer 15 in the middle of the DC motor driving circuit 4 performing driving of the DC motor M2, temporarily suspends the driving of the DC motor M2 by the DC motor driving circuit 4, and starts driving of the stepping motor M1 by the stepping motor driving circuit 3. Also, after the driving of the stepping motor M1 by the stepping motor driving circuit 3 is ended, the control circuit 8 re-starts the driving of the DC motor M2 by the DC motor driving circuit 4, which has been temporarily suspended.

First, a case will be described where the control circuit 8 has accepted the driving instruction Dm1 for driving the stepping motor M1 output from the host computer 15 via the interface circuit 9 in the middle of performing driving of the DC motor M2. In this case, the control circuit 8 stops supplying of the driving signal S2 from the DC motor driving circuit 4 to the DC motor M2. Next, the control circuit 8 starts supplying of the driving signal S1 from the stepping motor driving circuit 3 to the stepping motor M1, and starts driving of the stepping motor M1 based on the driving instruction Dm1. According to such a configuration, the driving of the stepping motor M1 according to the driving instruction Dm1 can be quickly started without incurring a waiting time, that is, without the driving instruction Dm1 being included in a queue. Also, the supplying of the driving signal S1 to the stepping motor M1 and the supplying of the driving signal S2 to the DC motor M2 are not performed at the same time, and therefore the increase in peak current can be suppressed, and the power consumption of the motor driving circuit 1M can be reduced.

After performing driving of the stepping motor M1 based on the driving instruction Dm1 for a predetermined time, the control circuit 8 stops supplying of the driving signal S1 from the stepping motor driving circuit 3 to the stepping motor M1, and ends driving of the stepping motor M1. Next, the control circuit 8 starts supplying of the driving signal S2 from the DC motor driving circuit 4 to the DC motor M2, and re-starts driving of the DC motor M2 that has been once stopped. Note that the re-starting driving of the DC motor M2 is performed based on the driving instruction Dm2 for driving the DC motor M2 that has been accepted from the host computer 15 before accepting the driving instruction Dm1 for driving the stepping motor M1. According to such a configuration, the remaining portion of the driving instruction Dm2 for driving the DC motor M2 can be executed after ending the driving of the stepping motor M1, and the operations instructed by the driving instruction Dm2 for driving the DC motor M2 can be completed. Note that this re-starting is preferably performed as soon as possible after ending the driving of the stepping motor M1.

Next, a case will be describe where the control circuit 8 has accepted the driving instruction Dm1 for driving the stepping motor M1 output from the host computer 15 via the interface circuit 9 in the middle of the constant current generation circuit 6 supplying a constant current to the load R. In this case, the control circuit 8 first stops supplying of the constant current from the constant current generation circuit 6 to the load R. In this state, no current is wasted other than that to the load R. That is, a current is not wastefully caused to flow to GND. Next, the control circuit 8 starts supplying of the driving signal S1 to the stepping motor M1 from the stepping motor driving circuit 3, and starts driving of the stepping motor M1 based on the driving instruction Dm1. According to such a configuration, the driving of the stepping motor M1 according to the driving instruction Dm1 can be quickly started without incurring a waiting time, that is, without the driving instruction Dm1 being included in a queue. Also, the supplying of the driving signal S1 to the stepping motor M1 and the supplying of the constant current to the load R are not performed at the same time, and therefore the increase in peak current can be suppressed, and the power consumption of the motor driving circuit 1M can be reduced.

After performing driving of the stepping motor M1 based on the driving instruction Dm1 for a predetermined time, the control circuit 8 stops supplying of the driving signal S1 from the stepping motor driving circuit 3 to the stepping motor M1, and ends driving of the stepping motor M1. Next, the control circuit 8 starts supplying of the constant current from the constant current generation circuit 6 to the load R, and re-starts supplying of the constant current to the load R that has been once stopped. Note that the re-starting of the supplying of the constant current to the load R is performed based on a constant current supplying instruction Dr for supplying the constant current to the load R that has been accepted from the host computer 15 before accepting the driving instruction Dm1 for driving the stepping motor M1. According to such a configuration, the remaining portion of the constant current supplying instruction Dr can be executed after ending the driving of the stepping motor M1, and the operations instructed by the constant current supplying instruction Dr can be completed. Note that this re-starting is preferably performed as soon as possible after ending the driving of the stepping motor M1.

As described above, in the present disclosure, the driving of the stepping motor M1 is preferentially performed to the driving of the DC motor M2. Also, the driving of the stepping motor M1 is preferentially performed to the supplying of power to the load R. In this case, regarding the driving of the DC motor M2 and the supplying power to the load R, any of the following cases can be adopted, (1) the former is preferentially performed, (2) the latter is preferentially performed, and (3) priority is not given, and the both are executed in parallel. The cases (1), (2), and (3) can be appropriately selected depending on the usage, the purpose of usage, and the use condition of the integrated circuit device 1.

As described above, the integrated circuit device 1 including the motor driving circuit 1M has been described. Such a motor driving circuit 1M includes the stepping motor driving circuit 3 that controls driving of the stepping motor M1, the DC motor driving circuit 4 that controls driving of the DC motor M2, and the control circuit 8 that controls the stepping motor driving circuit 3 and the DC motor driving circuit 4, as described above. Also, the control circuit 8, upon accepting the driving instruction Dm1 for driving the stepping motor M1 in the middle of the DC motor driving circuit 4 performing driving of the DC motor M2, stops driving of the DC motor M2 by the DC motor driving circuit 4, and starts driving of the stepping motor M1 by the stepping motor driving circuit 3.

According to such a configuration, the driving of the stepping motor M1 according to the driving instruction Dm1 can be quickly started without incurring a waiting time, that is, without the driving instruction Dm1 being included in a queue. Also, the supplying of the driving signal S1 to the stepping motor M1 and the supplying of the driving signal S2 to the DC motor M2 are not performed at the same time, and therefore the increase in peak current can be suppressed, and the power consumption of the motor driving circuit 1M can be reduced.

Also, as described above, the control circuit 8 re-starts the driving of the DC motor M2 by the DC motor driving circuit 4, after the driving of the stepping motor M1 by the stepping motor driving circuit 3 is ended. According to such a configuration, the remaining portion of the driving instruction Dm2 for driving the DC motor M2 can be executed after ending the driving of the stepping motor M1, and the operations instructed by the driving instruction Dm2 for driving the DC motor M2 can be completed.

Also, as described above, the motor driving circuit 1M includes the constant current generation circuit 6 that supplies a constant current to the load R. Also, the control circuit 8, upon accepting the driving instruction Dm1 for driving the stepping motor M1 in the middle of the constant current generation circuit 6 supplying the constant current to the load R, stops supplying of the constant current to the load R by the constant current generation circuit 6, and starts driving of the stepping motor M1 by the stepping motor driving circuit 3.

According to such a configuration, the driving of the stepping motor M1 according to the driving instruction Dm1 can be quickly started without incurring a waiting time, that is, without the driving instruction Dm1 being included in a queue. Also, the supplying of the driving signal S1 to the stepping motor M1 and the supplying of the constant current to the load R are not performed at the same time, and therefore the increase in peak current can be suppressed, and the power consumption of the motor driving circuit 1M can be reduced.

Also, as described above, the control circuit 8 re-starts the supplying of the constant current to the load R by the constant current generation circuit 6, after the driving of the stepping motor M1 by the stepping motor driving circuit 3 is ended. According to such a configuration, the remaining portion of the constant current supplying instruction Dr can be executed after ending the driving of the stepping motor M1, and the operations instructed by the constant current supplying instruction Dr can be completed.

Also, as described above, the integrated circuit device 1 includes the motor driving circuit 1M. Therefore, the integrated circuit device 1 can receive benefit of the effects of the motor driving circuit 1M. Therefore, the highly reliable integrated circuit device 1 can be obtained.

Also, as described above, with the motor control method, when the driving instruction Dm1 for driving the stepping motor M1 has been accepted in the middle of the driving of the DC motor M2 being performed, the driving of the DC motor M2 is stopped, and the driving of the stepping motor M1 is started. According to such a configuration, the driving of the stepping motor M1 according to the driving instruction Dm1 can be quickly started without incurring a waiting time, that is, without the driving instruction Dm1 being included in a queue. Also, the supplying of the driving signal S1 to the stepping motor M1 and the supplying of the driving signal S2 to the DC motor M2 are not performed at the same time, and therefore the increase in peak current can be suppressed, and the power consumption of the motor driving circuit 1M can be reduced.

Second Embodiment

Figure 2:
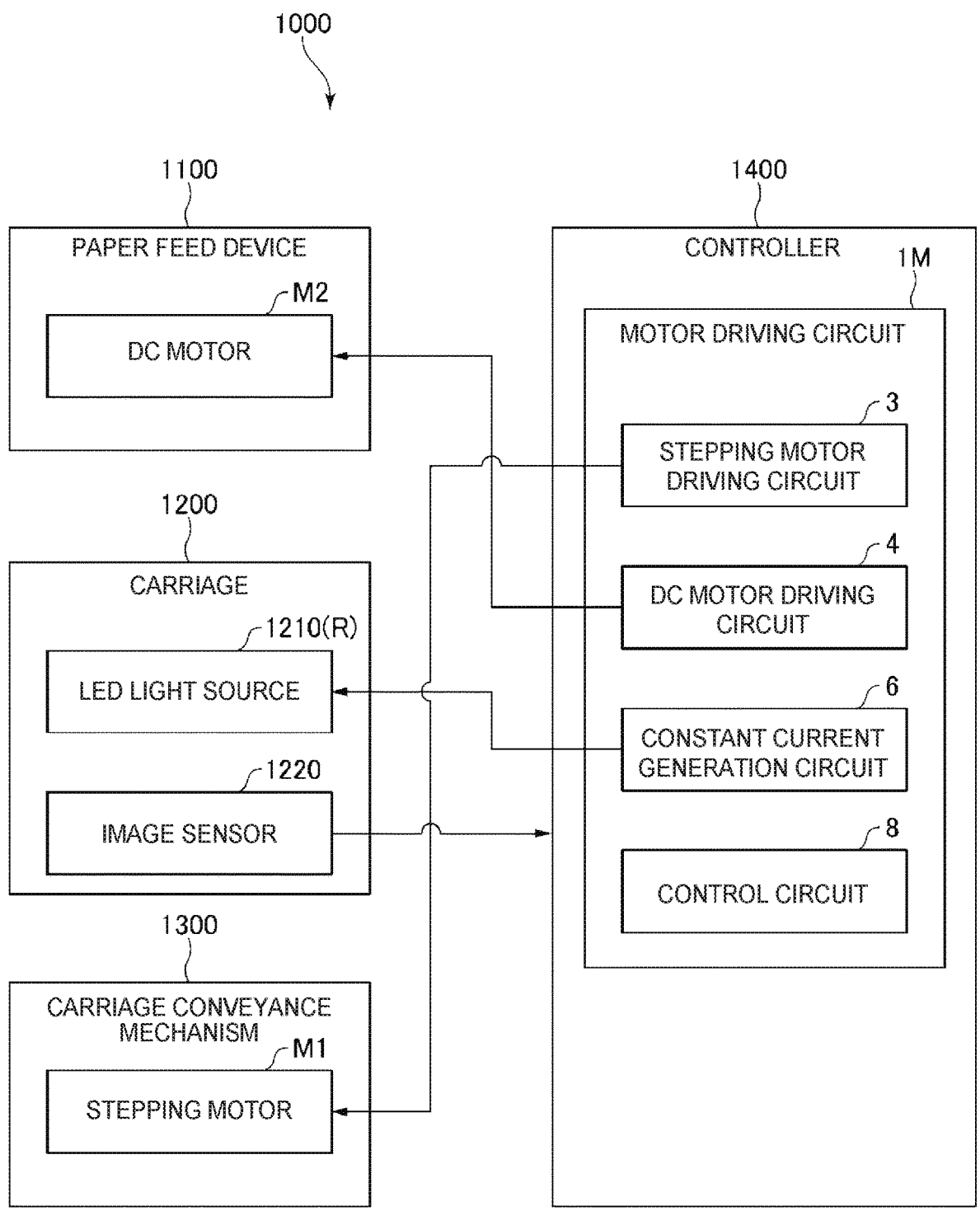
FIG. 2 is a block diagram illustrating an image reading device according to a second embodiment.

FIG. 2 is a block diagram illustrating an image reading device according to a second embodiment.

As shown in FIG. 2, the image reading device 1000, which is a flatbed-type image reading device, includes a paper feed device 1100, a carriage 1200, a carriage conveyance mechanism 1300, and a controller 1400 that performs various processing for reading an image.

The paper feed device 1100 includes an unshown paper feed tray, an unshown conveyance roller that conveys an original placed on the paper feed tray to a platen, and a DC motor M2 for driving the conveyance roller. As a result of rotationally driving the conveyance roller by driving the DC motor M2, the original placed on the paper feed tray is conveyed to the platen by the conveyance roller.

The carriage 1200 is arranged below the platen. Also, an LED light source 1210 for illuminating an original on the platen and an image sensor 1220 for reading the original on the platen are incorporated in the carriage 1200. Also, the carriage conveyance mechanism 1300 includes a stepping motor M1, and causes the carriage 1200 to move back and forth in a sub scanning direction relative to the platen by driving the stepping motor M1. In a state of the original on the platen being illuminated by the LED light source 1210, the carriage 1200 is moved in the sub scanning direction by the carriage conveyance mechanism 1300 while the original on the platen is moved in a main scanning direction by the paper feed device 1100, and as a result, the image of the entire original can be read by the image sensor 1220. The image read by the image sensor 1220 is transmitted to the controller 1400 and is saved.

The controller 1400 includes a motor driving circuit 1M. Also, the motor driving circuit 1M includes a stepping motor driving circuit 3 that controls driving of the stepping motor M1, a DC motor driving circuit 4 that controls driving of the DC motor M2, a constant current generation circuit 6 that supplies a constant current to the LED light source 1210, which is a load R, and a control circuit 8 that controls these circuits 3, 4, and 6. The configuration of such a motor driving circuit 1M is not specifically limited, and the configuration of the first embodiment described above can be used, for example. In this case, the stepping motor M1, the DC motor M2, and the LED light source 1210 operate according to the order of priority described above, under the control of the control circuit 8. Also, a configuration different from that of the first embodiment may also be used as the motor driving circuit 1M in the image reading device 1000.

As described above, the image reading device 1000, which is an electronic apparatus, includes the motor driving circuit 1M, the stepping motor M1, and the DC motor M2. Therefore, the image reading device 1000 can receive benefit of the effects of the motor driving circuit 1M, and can exert high reliability.

Note that the electronic apparatus including the motor driving circuit 1M is not limited to the image reading device 1000 described above, and can also be applied to a personal computer, a digital still camera, a tablet terminal, a clock, a smart watch, an ink-jet printer, a television, a smart glasses, a wearable terminal such as an HMD (head mounted display), a video camera, a video tape recorder, a car navigation device, a drive recorder, a pager, an electronic notebook, an electronic dictionary, an electronic translator, an electronic calculator, an electronic game machine, a toy, a word processor, a work station, a videophone, a surveillance television monitor, an electronic binoculars, a POS terminal, a medical apparatus, a fish finder, and various measurement apparatuses, for example.

As described above, the motor driving circuit, the integrated circuit device, the electronic apparatus, and the motor control method of the disclosure have been described based on the illustrated embodiments, but the present disclosure is not limited thereto, and the constituent element of each unit can be replaced by any constituent element having the similar function. Also, any constituent element may be added to the configuration of the present disclosure. Also, the embodiments described above may be appropriately combined.

Also, in the embodiments described above, the motor driving circuit 1M includes the stepping motor driving circuit 3, the DC motor driving circuit 4, the constant current generation circuit 6, the DC/DC converter circuit 7, the control circuit 8, the interface circuit 9, the reset circuit 10, the reference voltage circuit 11, and the oscillator circuit 12, but as long as the stepping motor driving circuit 3, the DC motor driving circuit 4, and the control circuit 8 are included, at least one of the other circuits may be omitted, or at least one other circuit may be added.

What is claimed is:

1. An electronic apparatus comprising:
    a motor driving circuit;
    a stepping motor; and
    a DC motor,
    wherein the motor driving circuit comprises:
    a stepping motor driving circuit configured to control driving of the stepping motor;
    a DC motor driving circuit configured to control driving of the DC motor; and
    a control circuit configured to control the stepping motor driving circuit and the DC motor driving circuit,
    wherein the control circuit, upon accepting a driving instruction for driving the stepping motor in the middle of the DC motor driving circuit performing driving of the DC motor, stops driving of the DC motor by the DC motor driving circuit, and starts driving of the stepping motor by the stepping motor driving circuit,
    wherein the stepping motor and the DC motor are both electrically connected to the motor driving circuit.

2. The electronic apparatus according to claim 1, wherein the control circuit re-starts driving of the DC motor by the DC motor driving circuit after the driving of the stepping motor by the stepping motor driving circuit is ended.

3. A motor control method comprising:
    when a driving instruction for driving a stepping motor has been accepted in the middle of performing driving of a DC motor,
    stopping driving of the DC motor; and
    starting driving of the stepping motor,
    wherein the stepping motor and the DC motor are both electrically connected to the motor driving circuit.

4. The motor control method according to claim 3, further comprising:
    when the driving instruction for driving the stepping motor has been accepted in the middle of performing supply of a constant current to a load, stopping supply of the constant current to the load; and
    starting driving of the stepping motor.

5. An electronic apparatus comprising:
    a motor driving circuit;
    a stepping motor; and
    a DC motor,
    wherein the motor driving circuit comprises:
    a stepping motor driving circuit configured to control driving of the stepping motor;
    a DC motor driving circuit configured to control driving of the DC motor;
    a constant current generation circuit configured to supply a constant current to a load; and
    a control circuit configured to control the stepping motor driving circuit, the DC motor driving circuit, and the constant current generation circuit,
    wherein the control circuit, upon accepting a driving instruction for driving the stepping motor in the middle of the constant current generation circuit performing supply of the constant current to the load, stops supply of the constant current to the load by the constant current generation circuit, and starts driving of the stepping motor by the stepping motor driving circuit,
    wherein the stepping motor and the DC motor are both electrically connected to the motor driving circuit.

6. The electronic apparatus according to claim 5, wherein the control circuit re-starts supply of the constant current to the load by the constant current generation circuit after the driving of the stepping motor by the stepping motor driving circuit is ended.

7. The electronic apparatus according to claim 5, wherein the control circuit, upon accepting the driving instruction for driving the stepping motor in the middle of the DC motor driving circuit performing driving of the DC motor, stops driving of the DC motor by the DC motor driving circuit, and starts driving of the stepping motor by the stepping motor driving circuit.

8. The electronic apparatus according to claim 7, wherein the control circuit re-starts driving of the DC motor by the DC motor driving circuit after the driving of the stepping motor by the stepping motor driving circuit is ended.

* * * * *